Dec. 3, 1940.    S. G. HIRSCH ET AL    2,224,080
CASTING REEL
Filed June 17, 1940

Inventors
Stephen G. Hirsch
George M. Gaul
by their Attorneys
Howson & Howson

Patented Dec. 3, 1940

2,224,080

UNITED STATES PATENT OFFICE 2,224,080

CASTING REEL

Stephen G. Hirsch and George M. Gaul, Philadelphia, Pa., assignors to Ocean City Manufacturing Company, Philadelphia, Pa., a corporation of Pennsylvania Application June 17, 1940, Serial No. 341,038

3 Claims. (Cl. 242—84.1)

This invention relates to fishing reels and, more particularly, to that type of casting reel ordinarily employed in surf casting.

A reel of this character comprises, in addition to the usual spool, a pair of end plates in which the spool shaft has bearing and spacing elements connecting the end plates to rigidify the two to one another. These spacing elements ordinarily include a rigid plate having tangs for engagement with the reel seat of a rod and a plurality of bars which, in some constructions, are substantially uniformly spaced about the remainder of the periphery of the end plates and secured to each thereof. These bars interfere with handling the reel, both in application of a line to the spool and in "thumbing" or braking of the reel when playing a fish. To improve the reel for both of these operations, it has been proposed to connect the reel end plates by the tang plate and by pairs of parallel bars which are located on a diameter of the reel substantially paralleling the general plane of the tang plate. While this arrangement considerably expedites application of a line to the reel and does afford a somewhat increased accessibility in the "thumbing" operation, it still leaves the reel with much to be desired in "thumbing" since the uppermost bar is ordinarily so disposed, in order to obtain sufficient rigidity in the reel structure, that it interferes in a large measure with "thumbing" particularly where the line on the spool has been nearly spent. An important object of the present invention is to modify the structure of the latter type reel in such manner that the same, and possibly increased strength is incorporated in the structure while the position of the upper bar, due to its formation, is so modified that practically full accessibility for the "thumbing" operation is provided.

Another and important object of the invention is the provision of a structure of this type which will permit modification of existing reels to the new structure simply by the removal of one of the bars of a pair and substitution thereof by a modified bar constructed in accordance with our invention.

These and other objects we attain by the construction shown in the accompanying drawing wherein, for the purpose of illustration, we have shown a preferred embodiment of our invention and wherein.

Figure 1:
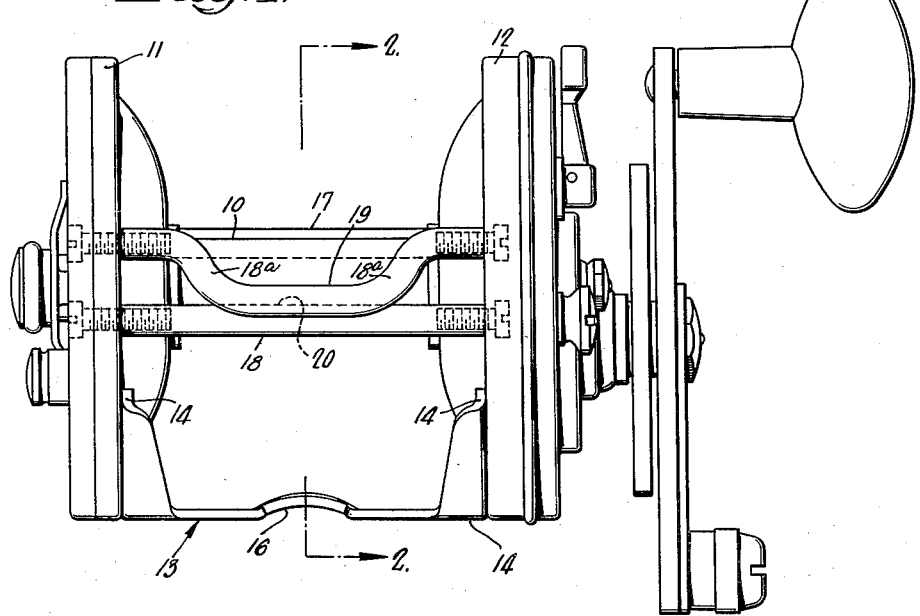
Fig. 1 is a side elevation of a reel embodying our invention.
Figure 2:
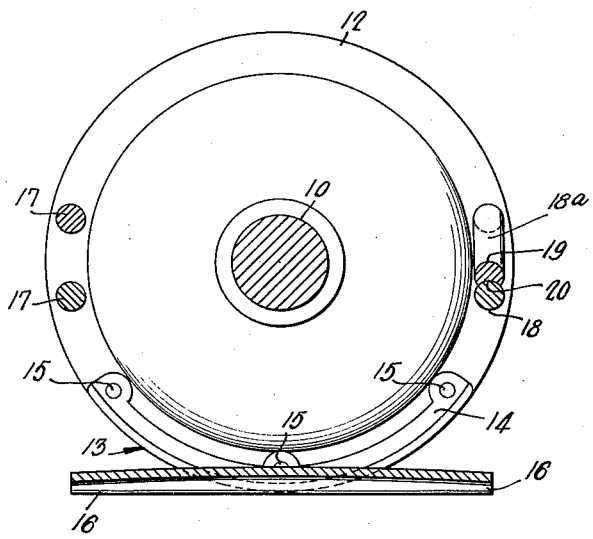
Fig. 2 is a section on line 2—2 of Fig. 1.

Referring now more particularly to the drawing, the numeral 10 generally designates a reel spool, and 11 and 12 designate end plates in which the spool is journaled. These end plates are connected by a rigid tang plate 13 having flanges 14 which are suitably secured to the end plates at 15 and embodying aligned tangs 16 for engagement with a reel seat, not herein shown. As a further means of connection, pairs of bars 17, 17 and 18, 18a are provided, the bars 17, 17 being disposed at one side of the reel and the bars 18, 18a being disposed at the opposite side thereof, said pairs of bars being disposed on a diameter of the reel substantially paralleling the general plane of the tangs 16 of tang plate 13.

The bars 17 may be parallel to one another and to the axis of the reel and secured to the end plates in any usual or suitable manner. Of the bars 18, 18a the bar 18 is likewise straight and parallel to the axis of the reel, while bar 18a has its center portion downwardly offset as indicated at 19 to bring it into contact with the bar 18. To enable these two bars to come into engagement which will prevent any possible relative displacement thereof through rotation of the bar 18a the under surface of the downwardly offset portion is notched, as by milling the same, at 20 so that it may seat upon and conform to the surface formation of the bar 18, the bars, as shown, being each in circling cross section. While a similar effect may be obtained by simply securing the bars to one another by a pin, screw or the like, it will be noted that with the arrangement just described, in a reel having parallel straight bars, it will be merely necessary to remove the uppermost of the bars and replace it with a bar of the construction of the bar 18a. Furthermore, a bar at either side of the reel may be removed and replaced by the bar 18a, thus enabling the invention to be applied with equal facility to reels employed by right or left-handed persons. The offsetting of the bar, as illustrated, will, as clearly shown in the drawing, afford ready access to the entire spool surface, at the same time the truss-like bracing engagement of the bars with one another prevents loss of strength in the assemblage and assures against any possible displacement of the offset portion from its proper position.

Since the construction illustrated is capable of certain modifications without in any manner departing from the spirit of our invention, we do not wish to be understood as limiting ourselves thereto except as hereinafter claimed.

We claim:

1. In a fishing reel, a reel spool, a pair of end plates rotatably supporting said spool and means for holding said plates in fixed spaced relation comprising a rigid plate having aligned reel-seat-engaging tangs and two pairs of bars arranged on opposite sides of the spool and upon a diameter thereof substantially paralleling the general plane of the tangs, the upper bar of one pair having its central portion downwardly offset to engage the lower bar of the pair, and means interengaging said bars to prevent rotative disengagement of said offset portion from said lower bar.

2. In a fishing reel, a reel spool, a pair of end plates rotatably supporting said spool and means for holding said plates in fixed spaced relation comprising a rigid plate having aligned reel-seat-engaging tangs and two pairs of bars arranged on opposite sides of the spool and upon a diameter thereof substantially paralleling the general plane of the tangs, the upper bar of one pair having its central portion downwardly offset to engage the lower bar of the pair, the offset portion of said upper bar being longitudinally notched to receive the lower bar whereby to prevent rotative disengagement of said offset portion from said lower bar.

3. In a fishing reel, a reel spool, a pair of end plates rotatably supporting said spool and means for holding said plates in fixed spaced relation comprising a rigid plate having aligned reel-seat-engaging tangs and two pairs of bars arranged on opposite sides of the spool and upon a diameter thereof substantially paralleling the general plane of the tangs, the upper bar of one pair having its central portion downwardly offset to engage the lower bar of the pair, said bars being of circular cross section, the offset portion of the upper bar having a longitudinal milled groove fitting the upper surface of the lower bar whereby to prevent rotative disengagement of said offset portion from said lower bar.

STEPHEN G. HIRSCH.
GEORGE M. GAUL.